(12) United States Patent
Yamaguchi

(10) Patent No.: US 7,711,190 B2
(45) Date of Patent: May 4, 2010

(54) IMAGING DEVICE, IMAGING METHOD AND IMAGING PROGRAM

(75) Inventor: Yoshihiro Yamaguchi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1098 days.

(21) Appl. No.: 11/365,671

(22) Filed: Mar. 2, 2006

(65) Prior Publication Data

US 2006/0204106 A1   Sep. 14, 2006

(30) Foreign Application Priority Data

Mar. 11, 2005   (JP) .............................. 2005-069879

(51) Int. Cl.
*G06K 9/00* (2006.01)

(52) U.S. Cl. ..................... 382/181; 345/419; 382/117; 382/118; 382/173

(58) Field of Classification Search ................ 382/118, 382/181, 117, 173, 190; 345/419
See application file for complete search history.

(56) References Cited

U.S. PATENT DOCUMENTS

| | | | |
|---|---|---|---|
| 5,878,156 A * | 3/1999 | Okumura | 382/118 |
| 7,127,086 B2 * | 10/2006 | Yuasa et al. | 382/118 |
| 7,202,792 B2 * | 4/2007 | Zhang et al. | 340/575 |
| 7,440,621 B2 * | 10/2008 | Iguchi et al. | 382/224 |
| 2002/0085771 A1 * | 7/2002 | Sakuramoto | 382/282 |
| 2003/0169908 A1 * | 9/2003 | Kim et al. | 382/118 |
| 2004/0136574 A1 * | 7/2004 | Kozakaya et al. | 382/118 |
| 2005/0041867 A1 * | 2/2005 | Loy et al. | 382/190 |
| 2005/0046626 A1 * | 3/2005 | Yoda et al. | 345/419 |
| 2005/0174451 A1 * | 8/2005 | Nozaki et al. | 348/240.99 |
| 2006/0204053 A1 * | 9/2006 | Mori et al. | 382/118 |

FOREIGN PATENT DOCUMENTS

JP   2001-45355 A   2/2001

* cited by examiner

*Primary Examiner*—Gregory M Desire
(74) *Attorney, Agent, or Firm*—Sughrue Mion, PLLC

(57) ABSTRACT

The present invention provides an imaging device comprising an imaging unit for photographing an image, a face extracting unit for extracting a face region including a person's face part from said image, a rating calculation unit for calculating a rating from said extracted face region, a threshold setting unit for accepting setting of a threshold for said rating, and a photograph indicating unit for indicating re-photograph based on comparison of said rating and said threshold. According to the imaging device of the present invention, re-photograph is indicated based on comparison of the rating and the threshold. A user can easily obtain a satisfactory image by repeating photograph until the rating obtained from the face region reaches the threshold.

17 Claims, 7 Drawing Sheets

IMAGING DEVICE, IMAGING METHOD AND IMAGING PROGRAM

BACKGROUND OF THE INVENTION

1. Field of the Invention

The present invention relates to an imaging device, an imaging method and an imaging program, more specifically to an imaging device and an imaging method for indicating re-photograph.

2. Description of the Related Art

Techniques for providing an image satisfactory to an object of the photograph have been developed. For example, according to the technique described in Japanese Patent Application Laid-Open No. 2001-45355, when a shutter button of a camera is pressed, a control unit of the camera continuously releases the shutter and continuously shoots gathering objects of the photograph. The taken image is displayed on a touch panel. Each of the objects decides a favorite image by touching arrow buttons and operating to switch the images displayed on the touch panel. Each of the objects touches the place of himself in the image on the touch panel. An image processing unit extracts the partial image where the object touches by performing edge emphasizing process and the like. The image processing unit combines a partial image which is selected by each of the object photographers in this manner.

SUMMARY OF THE INVENTION

As the technique described in Japanese Patent Application Laid-Open No. 2001-45355 combines partial images which are selected by respective objects and makes them into an image, it can make an image partially favorite to the respective objects but may make the image quite artificial as a whole. The technique also requires each of the objects to select a favorite partial image, which is complicated for the objects. The present invention is adapted in view of the problems and intends to enable the objects to easily obtain the satisfactory image as a whole.

In order to solve the abovementioned problem, an imaging device according to the present invention includes an imaging unit for photographing an image, a face extracting unit for extracting a face region including a person's face part from the image, a rating calculation unit for calculating a rating from the extracted face region, a threshold setting unit for accepting setting of a threshold for the rating, and a re-photograph indicating unit for indicating re-photograph based on comparison of the rating and the threshold.

According to the present invention, re-photograph is indicated based on comparison of the rating and the threshold. A user can easily obtain a satisfactory image by repeating photograph until the rating obtained from the face region reaches the threshold.

The imaging device according to the present invention further includes an eye-region detecting unit for detecting an eye-region which includes an eye from the face region, and an eye open/close detecting unit for determining whether the eye in the eye-region is open or close, wherein the rating calculation unit may calculate the rating based on the total number of face regions each of which is determined that an eye in the eye-region is open or close.

The rating calculation unit may calculate a number by dividing the total number of face regions each of which is determined that an eye in the eye-region is open by the total number of the face regions as the rating and the re-photograph indicating unit may indicate re-photograph when the rating falls short of the threshold.

The rating calculation unit may calculate a characteristic amount representing sharpness of the face region as the rating and the re-photograph indicating unit may indicate re-photograph when the rating falls short of the threshold.

The imaging device according to the present invention may further include a trimming unit for trimming the image so that the center of a rectangular region with the minimum area including the extracted face region matches the center of the image.

The imaging method according to the present invention includes the steps of: taking an image, extracting a face region including a person's face part from the image, calculating a rating from the extracted face region, accepting setting of a threshold for the rating, and indicating re-photograph based on comparison of the rating and the threshold.

The imaging device according to the present invention includes an imaging unit for photographing an image, a face extracting unit for extracting a face region including a person's face part from the image, a rating calculation unit for calculating a rating from said extracted face region, a threshold setting unit for accepting setting of a threshold for said rating, and a photograph indicating unit for indicating that a time appropriate for photographing an image has arrived based on comparison of said rating and said threshold.

The imaging method according to the present invention includes the steps of: photographing an image, extracting a face region including a person's face part from said image, calculating a rating from said extracted face region, accepting setting of a threshold for said rating, and indicating that a time appropriate for photographing an image has arrived based on comparison of said rating and said threshold.

The imaging program according to the present invention causes a computer to perform the steps of: photographing an image, extracting a face region including a person's face part from said image, calculating a rating from said extracted face region, accepting setting of a threshold for said rating, and indicating re-photograph based on comparison of the rating and the threshold.

The imaging program according to the present invention causes a computer to perform the steps of: photographing an image, extracting a face region including a person's face part from the image, calculating a rating from the extracted face region, accepting setting of a threshold for the rating, and indicating that a time appropriate for photographing an image has arrived based on comparison of the rating and the threshold.

According to the present invention, re-photograph is indicated based on comparison of the rating and the threshold. A user can easily obtain a satisfactory image by repeating photograph until the rating obtained from the face region reaches the threshold.

DETAILED DESCRIPTION OF THE PREFERRED EMBODIMENTS

Preferred embodiments of the present invention will be described below with reference to the attached drawings.

First Embodiment

Figure 1:
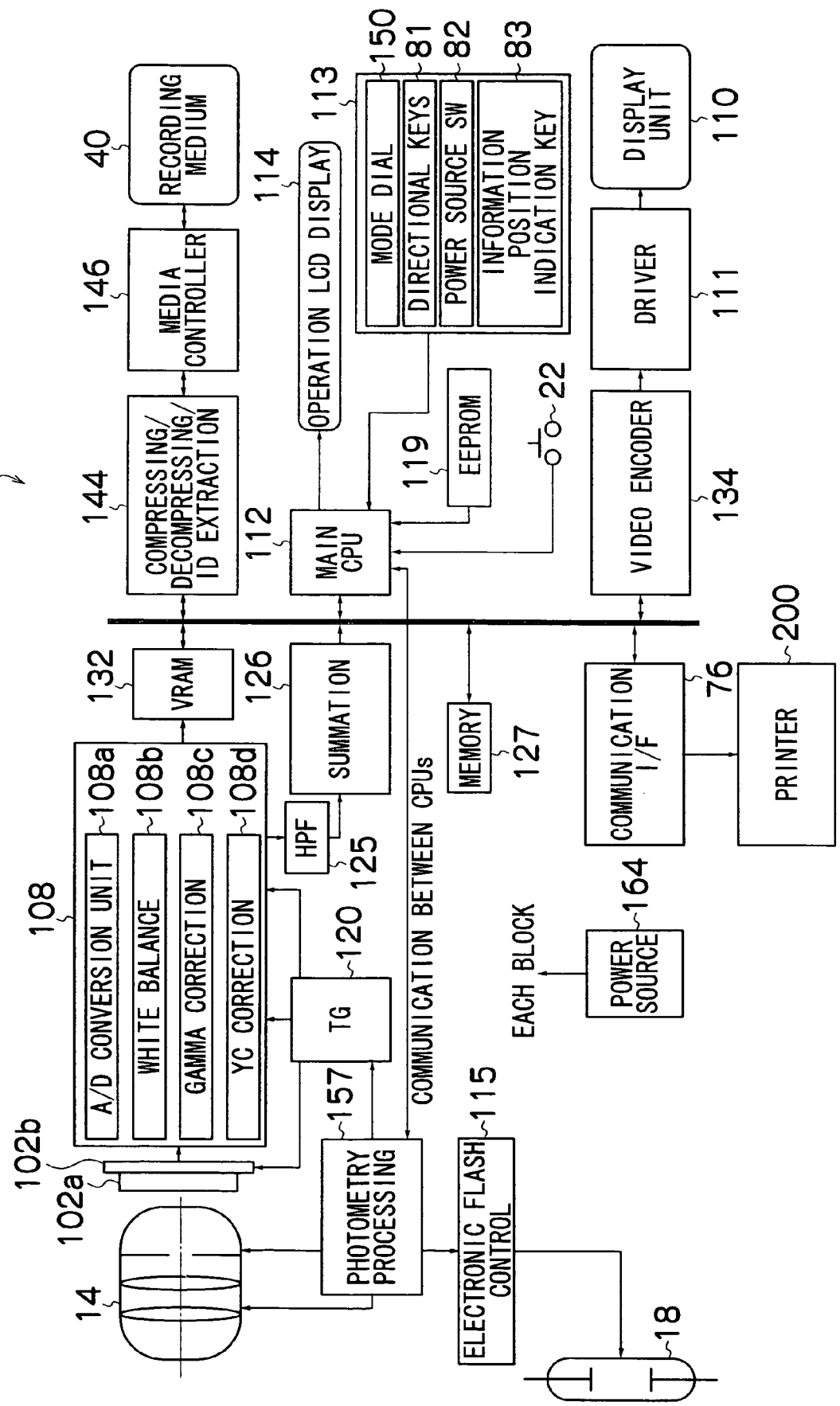
FIG. 1 is a block diagram of a digital camera according to a preferred embodiment of the present invention.

FIG. 1 is a functional block diagram of a digital camera 10 according to a preferred embodiment of the present invention. In the digital camera 10 of FIG. 1, a central processing unit (CPU) 112 controls over respective circuits in the digital camera 10 based on an input from respective buttons and keys of an operation unit 113 including a release switch 22 and a mode dial 150. A program executed by the CPU 112 is stored in EEPROM 119.

When a still image taking mode is set by the mode dial 150, the CPU 112 has a moving image (through image) displayed on a display unit 110 for enabling a user to check the angle to photograph. That is to say, a light passed through an imaging lens 14 incomes to a solid-state image sensor 102a. Photosensors are flatly arranged on an acceptance surface of the solid-state image sensor 102a. Each photo-sensor converts an image of the object formed on the acceptance surface into signal electrodes in an amount corresponding to the income light. The signal electrodes accumulated in this manner are serially read out as voltage signals (image signals) corresponding to the signal electrode based on pulse signals provided from a driver circuit (not shown) and applied to an imaging circuit 102b one after another.

The imaging circuit 102b includes a gain adjustment circuit. The respective piece of image data obtained at the imaging circuit 102b is sent to an image processing circuit 108 and a high-path filter (HPF) 125. The image processing circuit 108 is an image processing device including an A/D converting unit 108a, a white balance correction circuit 108b, a gamma correction circuit 108c, a YC processing circuit 108d, a brightness/color difference signal generation circuit, a sharpness correction circuit, a contrast correction circuit, an outline processing unit for performing image processing including outline processing on a photographed image, and a noise reduction processing unit for performing a noise reduction processing on an image. The image processing circuit 108 processes an image signal according to a command from the CPU 112.

The image data inputted into the image processing circuit 108 is converted into brightness signals (Y signals) and color difference signals (Cr, Cl signals) and subjected to a predetermined process such as gamma correction or the like, and then stored in VRAM 132.

Only a G pixel component is extracted from the image data, which was converted into digital signals at the A/D converting unit 108a of the imaging circuit 108, at the high-path filter (HPF) 125. Then, the extracted G pixel component is subjected to summation at a summation unit 126 and sent to the CPU 112. The CPU 112 calculates an average value in four areas near the center of the object which is arbitrarily set by directional keys 81 in the image data divided into 64 for a screen sent from the summation unit 126, and makes the average value as an auto-focus (AF) rating. The AF rating is calculated when each period of a predetermined cycle passes and updated at each time of calculation and stored in memory 127. The CPU 112 determines a focus of the object according to the AF rating. The CPU 112 may take any determination manner. For example the CPU 112 determines whether the AF rating reaches near the maximum point or not and if the AF rating reaches near the maximum point, the CPU 112 determines that the object is focused and; if otherwise, the CPU 112 determines that the object is not focused. Alternatively, the CPU 112 can determine the object is focused if the AF rating exceeds a predetermined threshold.

When a photographed image is output on a monitor of the display unit 110, a YC signal is read out from the VRAM 132 and sent to a video encoder 134. The video encoder 134 converts the inputted YC signal into a signal in a predetermined system for displaying (for example, a color complex image signal in the NTSC system) and outputs it on the display unit 110. The display unit 110 is driven via a driver 111.

The YC signal of each frame which is processed in a predetermined frame rate is written into an A region and a B region of the VRAM 132 alternately. The written YC signal is read out from a region other than the region to which a YC signal is being written among the A region and the B region of the VRAM 132. As the YC signal in the VRAM 132 is periodically rewritten and image signals generated from the YC signal is supplied to the display unit 110 in this manner, an image being photographed is displayed on the display unit 110 in real time. A user can check the angle of taking the image by an image (through) displayed on the display unit 110.

If the release switch 22 is pressed to half, AE and AF processing starts. When the release switch 22 is pressed to full after the AE/AF processing, imaging operation for recording starts. The image data obtained in response to pressing of the release switch 22 to full is converted into a brightness/color difference signal (Y/C signal) at the image processing circuit 108, subjected to predetermined processing such as gamma correction or the like and stored in the VRAM 132.

The Y/C signal stored in the VRAM 132 is compressed according to a predetermined format by a compressing/decompressing circuit 144, and then recorded on a recording medium 40 as an Exif (Exchangeable Image File Format) file via a media controller 146. The image is recorded in a data part of the Exif file. The CPU 112 records imaging date and time information to a predetermined tag (Imagedescription tag or the like) of a header part of the abovementioned Exif file. The recorded image can be sent to a printer 200 connected via a communication interface 76. The printer 200 prints the received image.

To the CPU 112, an electronic flash controlling circuit 115 for controlling light emission from an electronic flash 18 including a Xenon tube is also connected. When low luminance is detected or when light emission is indicated by an electronic flash button or when forced light emission is set in taking a still image, the electronic flash controlling circuit 115 controls the electronic flash 18 to emit a light for a short time (for example one second or more) at a timing synchronized to a timing signal generated by a timing generator 120.

When a moving image taking mode is set by the mode dial 150, moving image recording operation starts in response to pressing of the release switch 22 to full, and the moving image recording operation stops in response to pressing of the release switch 22 again. The present invention may be adapted to perform recording operation while the release switch 22 is pressed and stop the recording when the release switch 22 is released. Moving image data is recorded on a recording medium 40 in a motion JPEG (MPEG) form, for example.

When a playback mode is selected by the mode dial 150, compressed data of the final image file recorded on the recording medium 40 (a file recorded last) is read out. If a file according to the final recording is a still image file, the read out image compression data is decompressed to non-compressed YC signals through a compressing/decompressing circuit 144 and saved in the VRAM 132. The YC signals saved in the VRAM 132 is applied to the video encoder 134. The video encoder 134 creates a RGB color combined image signals in the NTSC system from the YC signals to be inputted and outputs the signal to the display unit 110. In this manner, a frame image of the final frame recorded on the recording medium 40 is displayed on the display unit 110.

When a right key of the directional keys 81 is pressed, frames are forwarded. When a left key of the directional keys 81 is pressed, frames goes backward. An image file at the frame position which is forwarded or gone backward is read out from the recording medium 40 and the frame image is played on the display unit 110 in the same manner as those described above. If frames are forwarded when a frame image of the final frame is displayed, an image file of the first frame recorded on the recording medium 40 is read out and the frame image of the first frame is played on the display unit 110.

The display unit 110 corresponds to an external display device connected to a LCD 114, a finder or an image outputting terminal included in the camera 10. The CPU 112 includes an OSD signal generation circuit, which generates signals for displaying characters and signs such as icons for indicating a shutter speed or an aperture value, the number of pictures available to be taken, date and time of taking the image, warning and the like. Signals outputted from the OSD signal generation circuit are mixed with image signals as required and supplied to the LCD 114. In this manner, a combined image, in which a through image or a replay image is combined with characters or icons, is displayed.

The recording medium 40 is a medium for saving image data obtained by taking an image. A memory card called smart media, for example, is used for the recording medium 40. The recording medium is not limited to that form, and any medium which can read and write according to an electronic system, a magnetic system, or an optical system, or a system of any combination of them can be used such as a PC card, a Compact Flash (Registered Trademark), a magnetic disk, an optical disk, a magnetic optical disk or a memory stick can be used for the recording medium. The present invention can be adapted to allow plural medium to be loaded whether they are the same model or the different models. A medium for saving an image file is not limited to a removable medium which can be loaded on the camera body and can be a recording medium (internal memory) included in a camera.

The CPU 112 is a controlling circuit for controlling over respective circuits of the camera 10. The CPU 112 controls operation of corresponding circuits based on signals received from the operation unit 113 including the release switch 22, the directional keys 81, a power switch 82, the mode dial 150, an information position indication key 83, or an electronic flash button, a zoom key and a menu/execution button, which are not shown. The CPU 112 also performs display control on the display unit 110, electronic flash light emission control, auto-focus (AF) control and automatic exposure (AE) control.

Each time the power of the camera 10 is turned on by the power switch 82, power is supplied from a main power source 164 composing of a battery loaded in the camera body to respective circuits of the digital camera 10.

Image data from the image processing circuit 108 is also sent to photometry processing unit 157. The photometry processing unit 157 is an example of a device for measuring an amount of outside light. The photometry processing unit 157 can include a photometry value calculation unit for calculating a photometry value (EV value) of the brightness of an object based on various types of inputted image data and a charge storage time of the solid-state image sensor 102a, i.e., a shutter time per second of an electronic shutter. By such configuration, driving of the solid-state image sensor 102a is adjusted. The embodiment may change an f/number as well as the shutter time per second of the electronic shutter. In changing the f/number, a photometry value is calculated depending on the brightness of the object in consideration of the f/number. As such, the photometry processing unit 157 detects the brightness of the object in the TTL (Through The Lens) photometric system by using the solid-state image sensor 102a as a photoreceiver. The photometry processing unit 157 may be any device if only it is available for photometric measurements such as a photometric sensor composing of photo-transistors.

A communication interface 76 can be connected with the printer 200. The communication interface 76 sends print data according to a command from the CPU 112.

Figure 2:
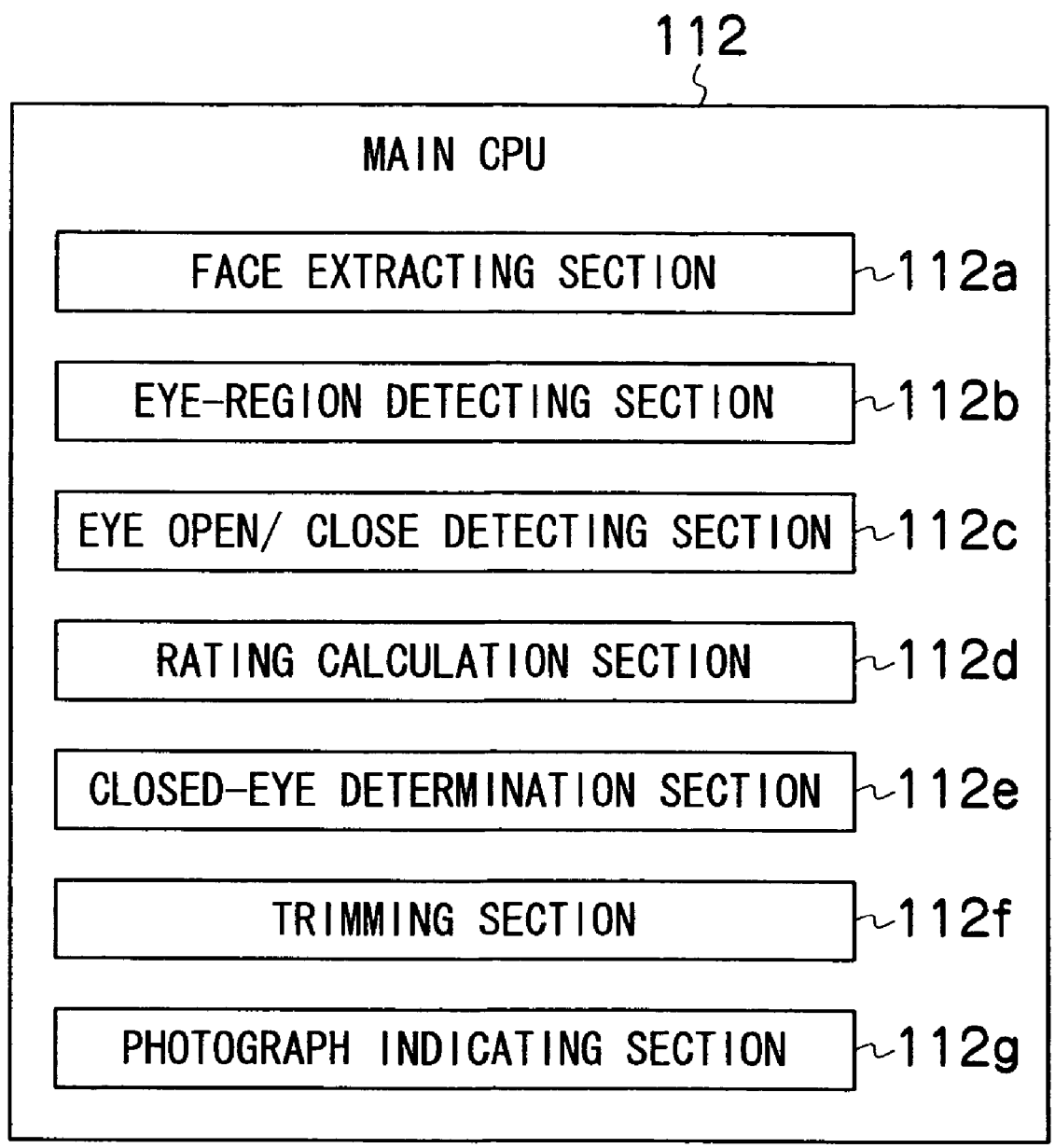
FIG. 2 is a block diagram showing a program executed by the CPU according to the present invention.

FIG. 2 is a block diagram showing a program executed by the CPU 112. The CPU 112 executes programs; a face extracting section 112a, an eye-region detecting section 112b, an eye open/close detecting section 112c, a rating calculation section 112d, a closed-eye determination section 112e, a trimming section 112f, and a photograph indicating section 112g. The face extracting section 112a extracts a face region, which is a region including a face part of a person, from an image stored in the VRAM 132. As a method of extracting a face region, a technique disclosed in the Japanese Patent Application Laid-Open No. 9-101579 titled "a method of extracting a face region and a method of determining a copying condition" filed by Fuji Photo Film Co., Ltd. may be applied, the disclosure of which is incorporated by reference. The technique determines whether a hue of each pixel of the photographed image is included in the range of the skin color or not and divides the image into the skin-color region and the non-skin-color region, while detecting an edge of the image and classifying each part of the image into the edge part and the non-edge part. Then the technique extracts a region surrounded by pixels, which are placed in the skin-color region and compose of pixels classified as the non-edge part and determined as the edge part, as a face candidate region, determines whether the extracted face candidate region is a region corresponding to a face of a person or not, and extracts the region as a face region based on the determination. A face region can also be extracted by the other techniques such as those described in Japanese Patent Application Laid-Open No. 2003-209683 and Japanese Patent Application Laid-Open No. 2002-199221, the disclosures of which are incorporated by reference.

The eye-region detecting section 112b detects an eye-region, which includes an eye, from a face region, which the face extracting section 112a extracts from an image. The eye-region can be detected based on relative location of a face rough center obtained as a result of detecting a face.

The eye open/close detecting section 112c determines whether the eye in the eye-region is open or close. A method of determining whether the eye is open or close is not particularly limited. For example, the eye open/close detecting section 112c detects the number of black pixels in the vertical direction in the two eyes regions corresponding to both eyes. The eye open/close detecting section 112c determines whether both eyes are open or close based on the numbers of black pixels in the vertical direction in the two eyes regions. The eye open/close detecting section 112c sums the total number M1 of face regions which are determined that both eyes are open and stores the sum in the memory 127.

The rating calculation section 112d calculates a rating f by the expression below:

$$f=M1/M0$$

That is to say, f indicates the ratio of persons who are opening their eyes among the persons recorded in the image.

The rating calculation section 112d may calculate the ratio of persons who are closing their eyes as:

$$f=[M0-M1/M0]$$

The closed-eye determination section 112e determines whether the rating f is a predetermined target value (threshold) f0, which is stored in the EEPROM 119, or more. The predetermined target value f0 can be arbitrarily set from the operation unit 113. The predetermined target value f0 which are set from the operation unit 113 is stored in the EEPROM 119. The trimming section 112f is used in the third embodiment (described later) and is not necessarily used by the CPU 112 in the first embodiment.

Figure 3:
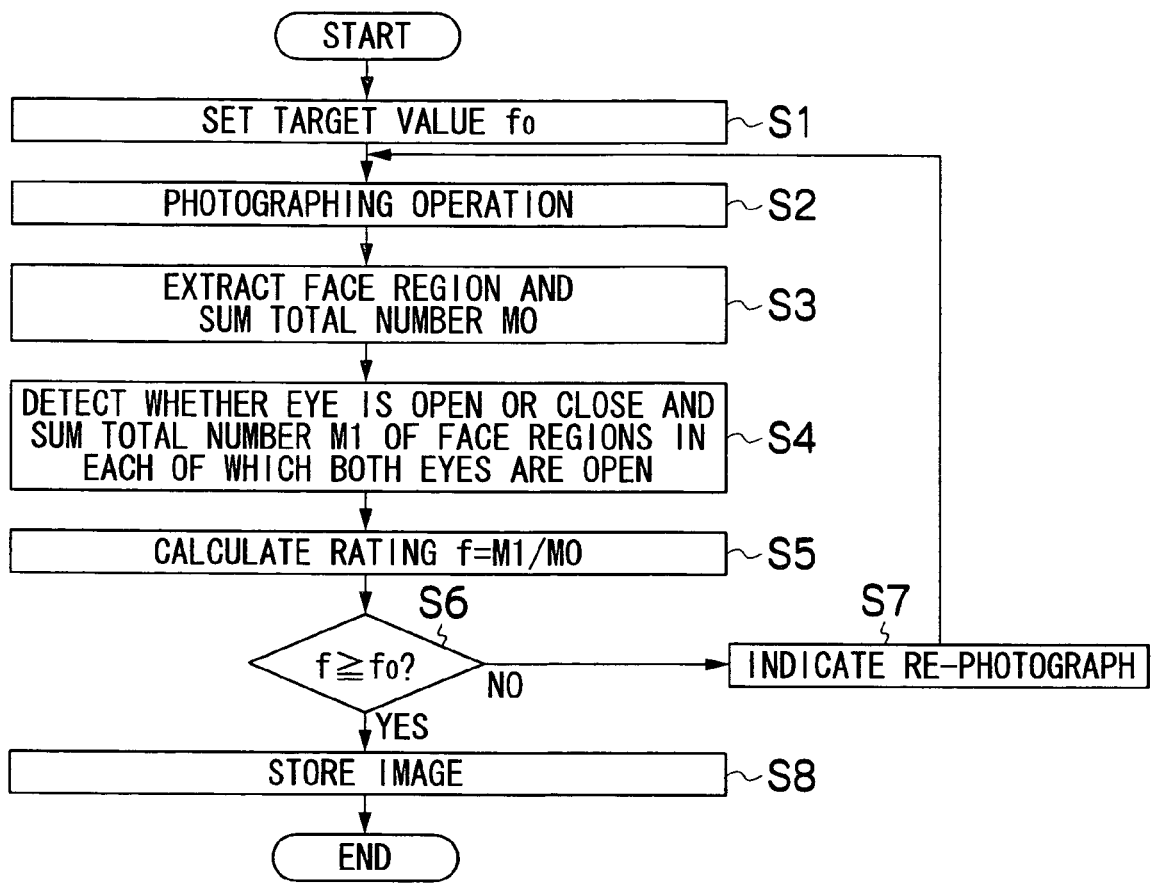
FIG. 3 is a flowchart showing a flow of photographing process according to the first embodiment.

FIG. 3 is a flowchart of photographing process according to the first embodiment.

That is to say, at S1, setting of a predetermined target value f0 is accepted from the operation unit 113. For example, when a group image of 25 persons including a person with dark colored sunglasses is photographed, eyes of the person with dark colored sunglasses cannot be detected. Then the target value f0=24/25 is set, aiming that all the persons other than the person with dark colored sunglasses are opening their eyes. The predetermined target value f0 set from the operation unit 113 is stored in the EEPROM 119.

At S2, photographing operation for recording starts in response to pressing of the release switch 22 to full. The image data obtained in response to the pressing of the release switch 22 to full is converted into brightness/color difference signals (Y/C signals) and subjected to predetermined process such as gamma correction at the image processing circuit 108, and stored in the VRAM 132.

At S3, the face extracting section 112a extracts a face region from an image saved in the VRAM 132. The face extracting section 112a sums the total number M0 of the extracted face regions and stores the sum in the memory 127.

At S4, the eye-region detecting section 112b detects an eye-region from the face regions extracted from the image. The eye open/close detecting section 112c determines whether an eye in the detected eye-region is open or not. The eye open/close detecting section 112c sums the total number M1 of the face regions which are determined that both eyes are open and stores the sum in the memory 127.

At S5, the rating calculation section 112d calculates the rating f=M1/M0 based on the determination by the eye open/close detecting section 112c.

At S6, the closed-eye determination section 112e determines whether a rating f≦a predetermined target value f0. If f≦f0, the operation proceeds to S8. If f<f0, the operation proceeds to S7.

Figure 4:
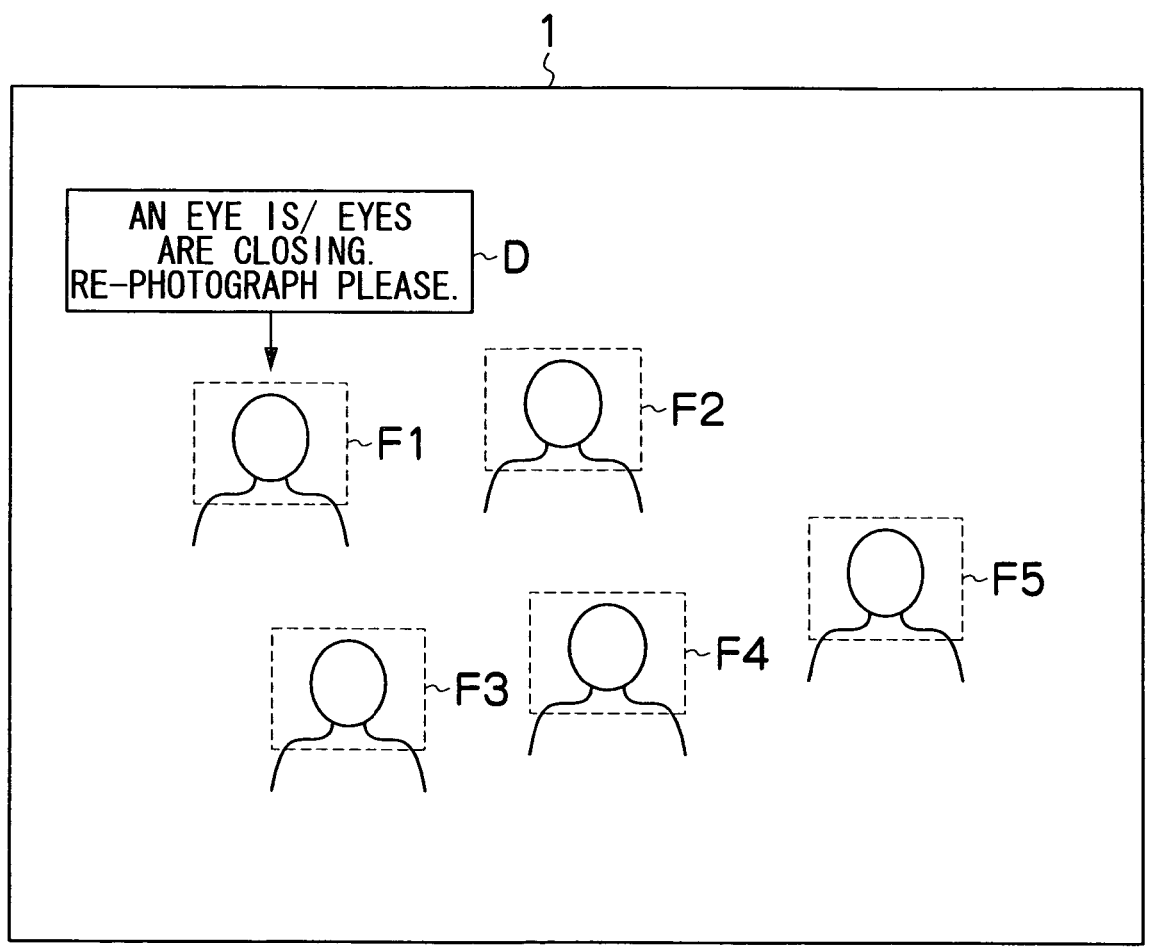
FIG. 4 is a diagram showing an exemplary display of a re-photograph indication.

At S7, the photograph indicating section 112g has an indication to ask for re-photograph displayed on the display unit 110. The place to display the indication may be near the face region which the eye open/close detecting section 112c determines that an eye is closing. For example, as shown in FIG. 4, when plural face regions F1-F5 are extracted from an image I for recording and if the face region F1 is determined that an eye is closing, an indication D is displayed near the face region F1. That enables a user to easily spot the person whose eye is closing. After an indication for re-photograph is displayed, the operation returns to S2, where photographing operation for recording starts in response to the pressing of the release switch 22 to full. The indication for re-photograph is not limited to a display on the display unit 110 and may be performed by another device if only it generates an indication which can be sensed by a person such as a buzzer function or a vibration function (not shown).

At S8, the image stored in the VRAM 132 (Y/C signals) is recorded as an Exif (Exchangeable Image File Format) file on the recording medium 40.

As mentioned above, if the rating calculated from the photographed image falls short of a set target value, re-photograph is indicated. Then, images are repeatedly photographed until a satisfactory image is obtained.

Second Embodiment

Although the abovementioned photographing operation is performed for image data for recording obtained in response to the pressing of the release switch 22 to full, the operation may be performed for image data (YC signals) of a through image in the VRAM 132 which is periodically rewritten.

Figure 5:
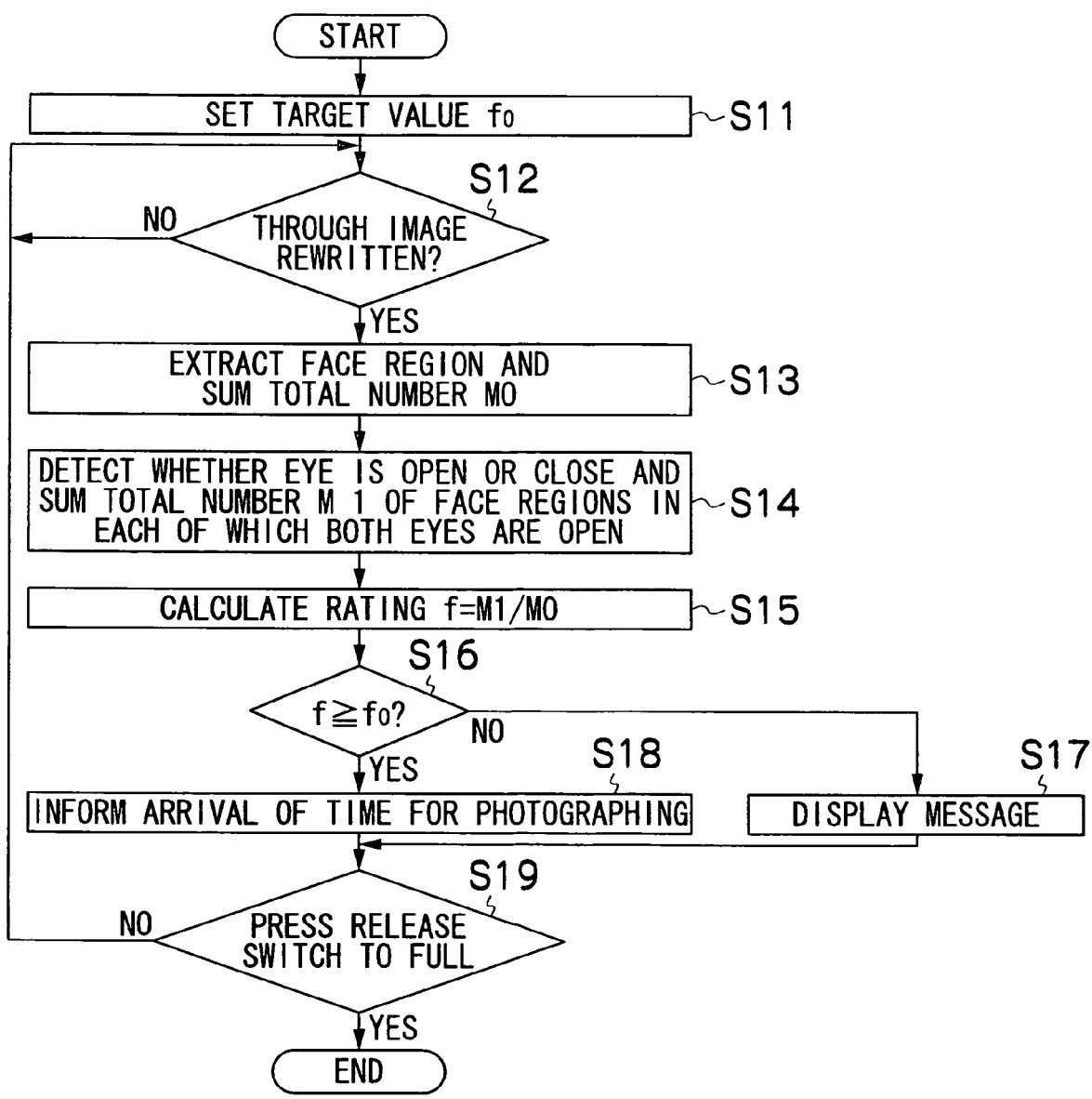
FIG. 5 is a flowchart showing photograph timing indicating process according to the second embodiment.

FIG. 5 is a flowchart of photograph timing indicating process according to the second embodiment.

At S11, setting of the target value f0 is accepted as in S1.

At S12, it is determined whether the YC signals of the through image in the VRAM 132 have been rewritten or not. If the through image has been rewritten, the operation proceeds to S13. If the through image has not been rewritten, the determination is repeated until the through image has been rewritten. As mentioned above, the through image is periodically rewritten between the A region and the B region. At S12, the operation can be transferred to S13 by every predetermined time period (for example, every one second) whether or not the image is rewritten.

At S13-S16, a rating is calculated by the same process as that of S3-S6. If the rating is determined as the target value or more, the operation proceeds to S18. If the rating is determined under the target value, the operation proceeds to S17.

At S17, the photograph indicating section 112g displays a message indicating that someone closes his eyes on the display unit 110. The place to display the indication may be near the face region which the eye open/close detecting section 112c determines that an eye is closing.

At S18, the photograph indicating section 112g displays an indication that a time appropriate for photographing has arrived on the display unit 110.

At S19, it is determined whether the release switch 22 is pressed to full or not. If the release switch 22 is pressed to full, the process ends. After the end of the process, image recording operation is performed. The image recording operation may be followed by the photographing operation of the first embodiment. If the release switch 22 is not pressed to full, the operation proceeds to S12.

As the closed-eye determination is performed on the through image which is periodically rewritten and the result is displayed in the above process, indication can be made in real time to photograph at the time when closed-eye occurs within an allowable range.

Third Embodiment

Although an image stored in the VRAM 132 may be simply recorded on the recording medium 40 as in the first embodiment, the image may be trimmed so that face regions are placed in balance.

Figure 6:
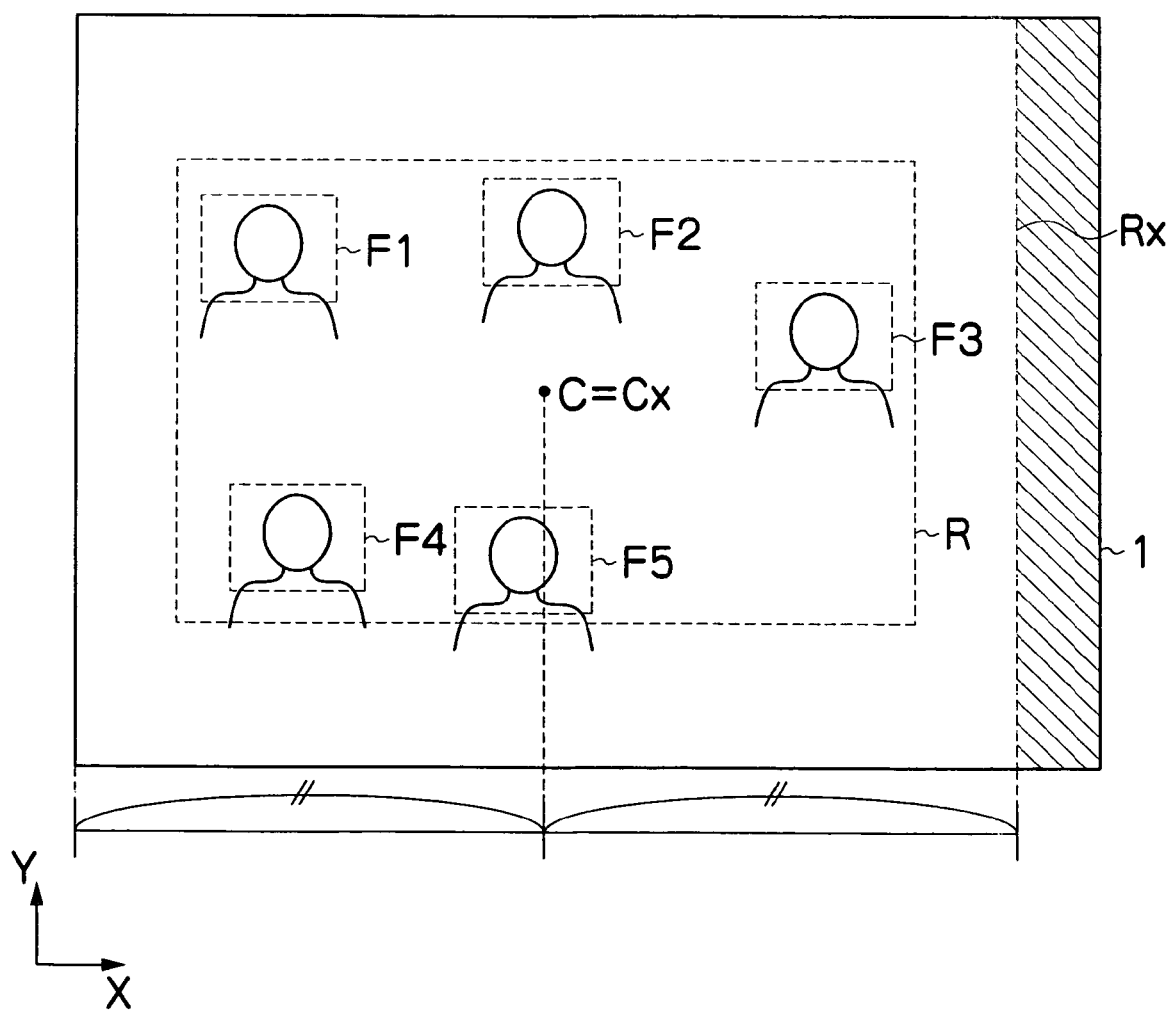
FIG. 6 is a diagram showing an example of a trimming region.

For example, as shown in FIG. 6, if plural face regions F1-F5 are extracted from an image I for recording, the trimming section 112f decides a rectangular region R whose area is the minimum including all the face regions F1-F5 and the center C of the region R. Then, the trimming section 112f decides a region Rx, in which the center Cx along the horizontal direction X from the center C is the center in the direction X and the center Cy along the vertical direction Y from the center C is the center in the direction Y, as a trimming region. The trimming section 112f cuts an image included in the region Rx and records the image on the recording medium 40. All the face regions F1-F5 are placed in balance horizontally in the image trimmed in this manner.

The trimming section 112f may decide a region Ry, in which the center Cy along the horizontal direction Y from the center C is the center in the direction Y and the center Cx along the vertical direction X of the image I is the center in the direction X, as a trimming region, cut an image included in the trimming region and record the image on the recording medium 40. All the face regions F1-F5 are placed in balance vertically in the image trimmed in this manner.

Fourth Embodiment

A method of calculating a rating is not limited to the above-mentioned method and a rating may be calculated by calculating a characteristic amount representing sharpness of a face region as a rating, comparing the rating and a preset target value and indicating re-photograph.

The rating calculation section 112d according to the fourth embodiment calculates a rating f for each of the extracted face regions.

An example of a specific calculation of the rating f is shown below: The rating calculation section 112d divides the inputted brightness signals of a face region into an odd number field and an even number field and obtains a delta histogram for each field. That is to say, the rating calculation section 112d first sets an averaging filter with a predetermined coefficient to each filed of brightness signals and creates a blurred image.

Then, the rating calculation section 112d makes a histogram out from difference values between a pixel in each field and surrounding eight pixels. The rating calculation section 112d performs the process for all the pixels in the field and obtains a delta histogram.

The rating calculation section 112d cumulatively sums the brightness difference levels of the delta histogram from 0 to 255 and obtains a cumulative delta histogram. The rating calculation section 112d also performs the process for the inputted brightness signals. The rating calculation section 112d averages magnitudes of differences of the cumulative delta histogram for the inputted brightness signals and the cumulative histogram for a blurred picture on the brightness difference level and makes the average as the rating f. Such a technique is disclosed in "analysis and evaluation of a digital color image (University of Tokyo Press)", for example, the disclosure of which is incorporated by reference.

The calculated f is stored in the memory 127. The rating f is a characteristic amount representing sharpness of the face region. The bigger the f is, the more the components of the higher frequencies in the image, and the more sharply the outline of the face region appears.

A specific method of calculating the rating f is not limited to the above method, and various types of sharpness indexes obtained by using MTF (Modulation Transmission Function) may be used as the rating f. Such a technique is disclosed in "New edition: handbook of image analysis (University of Tokyo Press)", for example, the disclosure of which is incorporated by reference.

Figure 7:
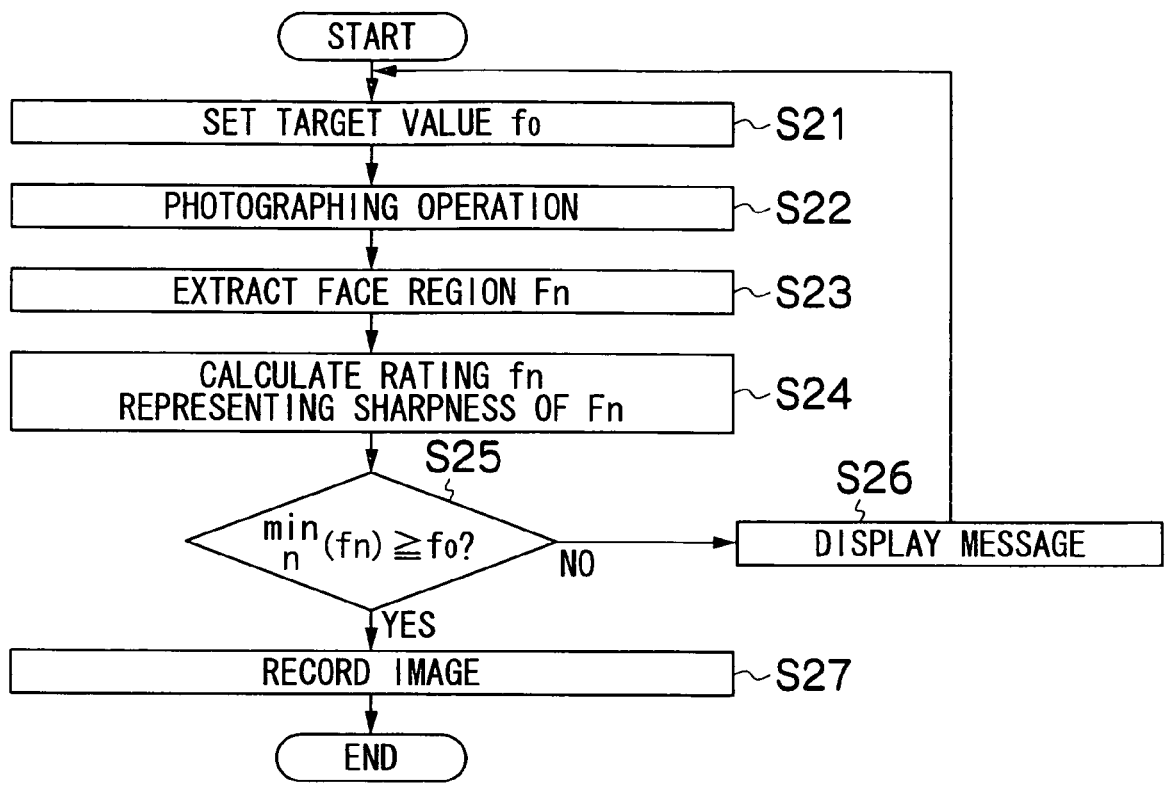
FIG. 7 is a flowchart showing a flow of photographing process according to the third embodiment.

A flow of photographing process according to the fourth embodiment will be described with reference to a flowchart of FIG. 7.

At S21, setting of the target value f0 is accepted as in S1.

At S22, photographing operation for recording starts in response to pressing of the release switch 22 to full. The image data obtained in response to the pressing of the release switch 22 to full is converted into brightness/color difference signals (Y/C signals) and subjected to predetermined process such as gamma correction at the image processing circuit 108, and stored in the VRAM 132.

At S23, the face extracting section 112a extracts a face region Fn from an image I stored in the VRAM 132. Here, n is a serial number allocated to a face region. If no face region can be extracted from the read image, an indication of it may be displayed on the display unit 110.

At S24, the rating calculation section 112d calculates a rating fn representing sharpness of each face region Fn.

At S25, the closed-eye determination section 112e determines whether min (fn)>, which is the minimum value of the rating fn,=a predetermined target value f0 or not. If min (fn)≧f0, the operation proceeds to S27. If min (fn)<f0, the operation proceeds to S26.

At S26, the photograph indicating section 112g has an indication to ask for re-photograph displayed on the display unit 110.

At S27, the image (Y/C signals) stored in the VRAM 132 is recorded as an Exif (Exchangeable Image File Format) file on the recording medium 40.

Fifth Embodiment

The face extracting section 112a, the rating calculation section 112d, the eye-region detecting section 112b, the eye open/close detecting section 112c, the closed-eye determination section 112e, the trimming section 112f, and the photograph indicating section 112g in the first to fourth embodiments mentioned above are programs executed in the general purpose CPU 112. Another aspect of implementing a part of or an entire of the programs in an ASIC (Application Specific Integrated Circuit) dedicated to image processing is also possible. That is preferable as it reduces the load to the CPU 112.

What is claimed is:

1. An imaging device comprising:
   an imaging unit for photographing an image;
   a face extracting unit for extracting a face region including a person's face part from said image;
   a rating calculation unit for calculating a rating from said extracted face region;
   a threshold setting unit for accepting setting of a threshold for said rating; and
   a re-photograph indicating unit for judging whether to indicate a re-photographing based on comparison of said rating and said threshold and indicating, to a user, re-photograph based on said judgment.

2. The imaging device according to claim 1, further comprising:
- an eye-region detecting unit for detecting an eye-region which includes an eye from said face region; and
- an eye open/close detecting unit for determining whether the eye in said eye-region is open or close,
- wherein said rating calculation unit calculates said rating based on the total number of face regions each of which is determined that an eye in said eye-region is open or close.

3. The imaging device according to claim 2, wherein
- said rating calculation unit calculates a number by dividing the total number of face regions each of which is determined that an eye in said eye-region is open by the total number of said face regions as said rating, and
- said re-photograph indicating unit indicates re-photograph when said rating falls short of said threshold.

4. The imaging device according to claim 2, further comprising a trimming unit for trimming said image so that the center of a rectangular region with the minimum area including said extracted face region matches the center of said image.

5. The imaging device according to claim 3, further comprising a trimming unit for trimming said image so that the center of a rectangular region with the minimum area including said extracted face region matches the center of said image.

6. The imaging device according to claim 1, wherein
- said rating calculation unit calculates a characteristic amount representing sharpness of said face region as said rating, and
- the re-photograph indicating unit indicates re-photograph when the rating falls short of the threshold.

7. The imaging device according to claim 6, further comprising a trimming unit for trimming said image so that the center of a rectangular region with the minimum area including said extracted face region matches the center of said image.

8. The imaging device according to claim 1, further comprising a trimming unit for trimming said image so that the center of a rectangular region with the minimum area including said extracted face region matches the center of said image.

9. The imaging device of claim 1, wherein:
- said indication of re-photograph comprises indicating to the user a specific face region that needs to be re-photographed via at least one of display message.

10. The imaging device of claim 1, wherein:
- said imaging unit periodically generates a through image in response to a partial press of a capture button; and
- said face extracting unit extracts said face region including a person's face part from said through image.

11. The imaging device of claim 1, wherein the imaging unit generates an image to be recorded in response to a full press of a capture button, and said face extracting unit extracts said face region including a person's face part from the image to be recorded.

12. An imaging method comprising the steps of:
- taking an image;
- performing via one or more processors the steps of:
  - extracting a face region including a person's face part from said image,
  - calculating a rating from said extracted face region,
  - accepting setting of a threshold for said rating, and
  - judging whether to indicate a re-photographing based on comparison of said rating and said threshold; and
- indicating, to a user, with an indicating unit, re-photograph based on said judgment.

13. An imaging device comprising:
- an imaging unit for photographing an image;
- a face extracting unit for extracting a face region including a person's face part from said image;
- a rating calculation unit for calculating a rating from said extracted face region;
- a threshold setting unit for accepting setting of a threshold for said rating; and
- a photograph indicating unit for judging whether to indicate a time appropriate for photographing an image has arrived based on comparison of said rating and said threshold and indicating to a user that the time appropriate for photographing an image has arrived according to the judgment.

14. An imaging method comprising the steps of:
- photographing an image;
- performing via one or more processors the steps of:
  - extracting a face region including a person's face part from said image,
  - calculating a rating from said extracted face region,
  - accepting setting of a threshold for said rating, and
  - judging whether to indicate a time appropriate for photographing an image has arrived based on comparison of said rating and said threshold; and
- indicating to a user, with a photograph indicating unit, that said time appropriate for photographing an image has arrived based on said judgment.

15. An imaging program, embodied on a computer-readable medium, causing a computer to perform the steps of:
- photographing an image;
- extracting a face region including a person's face part from said image;
- calculating a rating from said extracted face region;
- accepting setting of a threshold for said rating;
- judging whether to indicate a re-photographing based on comparison of said rating and said threshold; and
- indicating, to a user, re-photograph based on said judgment.

16. An imaging program, embodied on a computer-readable medium, causing a computer to perform the steps of:
- photographing an image;
- extracting a face region including a person's face part from said image;
- calculating a rating from said extracted face region;
- accepting setting of a threshold for said rating;
- judging whether to indicate a time appropriate for photographing an image has arrived based on comparison of said rating and said threshold; and
- indicating, to a user, that a time appropriate for photographing an image has arrived based on said judgment.

17. An imaging device comprising:
- an imaging unit for photographing an image including a plurality of people;
- a face extracting unit for extracting a plurality of face regions from said image, each extracted face region including one of the plurality of people's face part;
- a rating calculation unit for calculating a rating based on said extracted face regions;
- a threshold setting unit for accepting setting of a threshold for said rating; and
- a re-photograph indicating unit for judging whether to indicate a re-photographing based on comparison of said rating and said threshold and indicating re-photograph based on said judgment.

* * * * *